United States Patent

Croset

[15] 3,638,454

[45] Feb. 1, 1972

[54] FLEXIBLE COUPLING

[72] Inventor: Louis Paul Croset, Fixby, England

[73] Assignee: Forjors A.G., Zug, Switzerland

[22] Filed: Dec. 12, 1969

[21] Appl. No.: 884,540

[30] Foreign Application Priority Data

Dec. 12, 1968 Switzerland..........................18548/68

[52] U.S. Cl......................................................64/14, 64/9
[51] Int. Cl.............................................................F16d 3/64
[58] Field of Search....................................64/14, 13, 11, 9

[56] References Cited

UNITED STATES PATENTS

| | | | |
|---|---|---|---|
| 1,780,727 | 11/1930 | Tenaey | 64/14 |
| 2,502,790 | 4/1950 | Jencick | 64/14 |

FOREIGN PATENTS OR APPLICATIONS 691,638  3/1953  Great Britain..............................64/14

Primary Examiner—Mark M. Newman
Assistant Examiner—Randall Heald
Attorney—Waters, Roditi, Schwartz & Nissen

[57] ABSTRACT

A flexible coupling comprises two concentric (coaxial) flanged members with alternate blades which define circumferentially spaced apertures in which are fitted the radial arms of an elastic load transmission member. The load transmission member has a central annular or ring portion to which the radial arms are secured and at the junction of the arms with the central ring, there are axial recesses to maintain contact between the annular ring and the confronting circular inner blade surfaces when the radial arms are deformed during torque transmittance.

10 Claims, 8 Drawing Figures

FLEXIBLE COUPLING

BRIEF SUMMARY OF THE INVENTION

This invention relates to a flexible coupling comprising two coaxial coupling members with radial flanges. For transmission of the load at any time, the flanges carry axially projecting circumferentially spaced blades which generally extend radially, the blades of one member alternating with the blades of the other. Spaces are provided between the blades for the purpose of mounting a load transmission element made of a resilient rubber substance and consisting of a central, annular portion and external radial pressure arms corresponding to the last-mentioned spaces for insertion therein for transmission of the load. The radial arms are elliptical in shape and generally rectangular in section. Under torque load transmission and for each direction of rotation, one-half of the elastic arms (the driving arms) are deformed and the other half (the trailing arms) are out of contact with the blades.

Such couplings are suitable for both horizontal and vertical assembly of the driven machine and prime mover. One coupling member can have hub and flange parts and the other member merely one flange part, or both coupling members may simply have flange parts.

Known couplings of this type present a clearance between the annular part of the particular load transmission element and the contiguous inner blade faces, so that there is no contact between the annular part and the last-mentioned blade faces. If the driving arms of the load transmission element, which are transmitting the load at the particular time are deformed under the pressure of the blades, a corresponding play arises between the unloaded trailing arms of the load transmission elastic element and the blades of the coupling members, causing the annular part and the last-mentioned trailing arms of the load transmission unit to buckle outward under the effect of centrifugal force, as there is no means available for counteracting such deflection. In practical operation this gives rise to the serious disadvantage that the load transmission unit becomes prematurely destroyed as a consequence of local overstrain, so that couplings have to be prohibitively oversized at the present time. Accordingly it has hitherto been practical to construct only rather small flexible couplings for comparatively small performance and for the transmission of small torques.

An object of the present invention is to produce a flexible coupling which avoids the disadvantages of the known couplings of this type and whose dimensions are comparable with those of gear tooth couplings of equal load transmission capacity and which can accommodate an angle of inclination up to 1° to 2°.

The flexible coupling according to the invention is characterized by there being continuous contact between the faces of the annular portion of the transmission unit between adjacent elliptical pressure arms, and the corresponding inner faces of the blades of the coupling members. The pressure arms each have in the region of their connection with the annular part, two axial recesses to maintain the contact between the last-mentioned annular surfaces and the corresponding inner faces of the blades even during deformation under stress of the loaded pressure arms of the load transmission unit at any particular time and to prevent the unloaded arms of the load transmission unit (not making contact with the blades at such time) from deflecting outward because of centrifugal force. Both the driving and trailing arms of the load transmission elastic element under these circumstances remain centered in their working position.

In addition to enhance load transmission capacity, an important advantage of the flexible coupling arises from the fact that the centering of the load transmission element i.e., the pressure arms thereof, through contact with the inner blade faces, facilitates both the use of a load transmission element made in one piece especially for comparatively small couplings as well as of a transmission element consisting of several segments especially for the economic manufacture, assembly and servicing of comparatively large flexible couplings, such as those used in rolling mills or similar heavy industrial installations. Moreover, in addition to the advantages of gear tooth couplings, such accommodation of shaft alignment and relative axial mobility of the shafts for example, the flexible coupling according to the invention does not require any lubrication, has a high shock-absorptive capacity and is silent in operation.

A preferred embodiment of the flexible coupling according to the invention comprises an external coupling member with a sleeve and an inner coupling member with a hub portion which can be introduced into the sleeve. The hub portion can fit snugly into a bore in the sleeve, so as to ensure accurate centering of the coupling member blades with respect to the pressure arm of the transmission element when the last-mentioned blades are inserted between the said pressure arms. In this way, a clearance between the hub portion and the sleeve can be advantageously available in the working position of the coupling member, to permit operation with a slight misalignment of the shafts.

DETAILED DESCRIPTION

Figure 1:
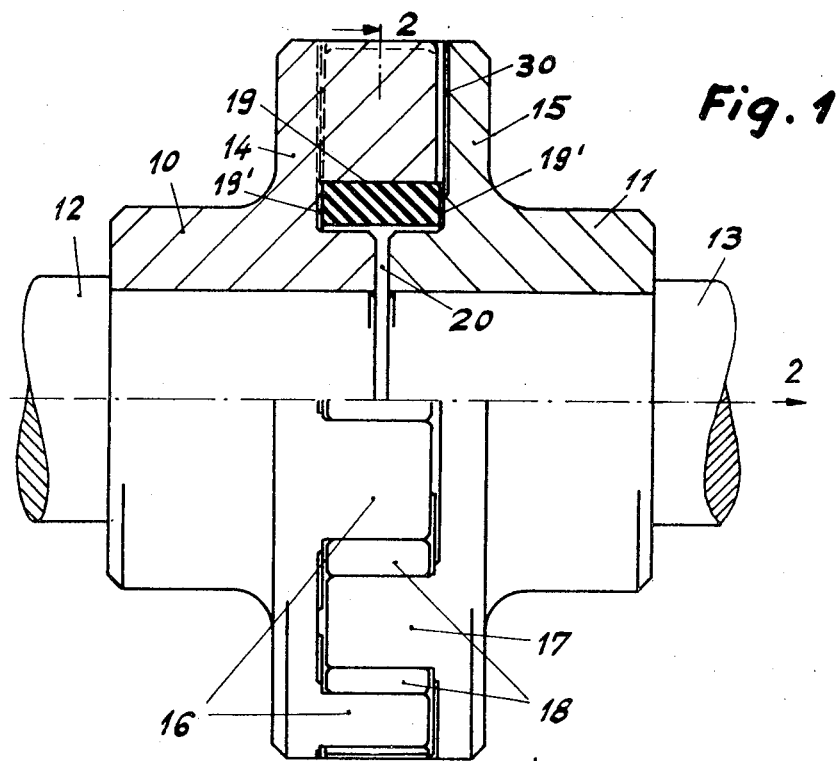
FIG. 1 is a side elevation view of a flexible coupling partly in section as taken along line 1—1 of FIG. 2.

FIG. 1 shows two identical, concentric coupling members 10,11 mounted on shafts 12,13 with a clearance 20 and having flanges 14,15 provided with radial blades 16,17. The blades 16,17 of the coupling members 10,11 are disposed around the periphery of the members 10,11 in alternate relation and they are engaged and form elliptical spaces between one another. Into the spaces are placed elliptical pressure arms 18 of a load transmission element preferably with a tight fit. The pressure arms 18 are integrally connected with a central annular part 19 of the transmission element. The annular part 19 has faces 21 between adjacent elliptical pressure arms 18 of the transmission element which are in close contact with corresponding inner faces 21' of blades 16,17. In this way the free pressure arms 18' (at that time not under operative load) which are not in contact with the coupling blade sides 22 (see FIG. 2b), are prevented from deflecting outward under the action of centrifugal force. Two axial recesses 23 are further provided in the region of the junction of the elliptical pressure arms 18 with the annular part 19, and the recesses 23 form axial clearances with the adjacent blades to compensate for the deformation of the then loaded pressure arms 18" (see FIG. 2b), in such a way that the last-mentioned contact between the load transmission element and the inner surfaces 21' of the coupling blades 16,17 of the coupling members 10,11 also remain constantly effective during the said deformation.

Figure 2:
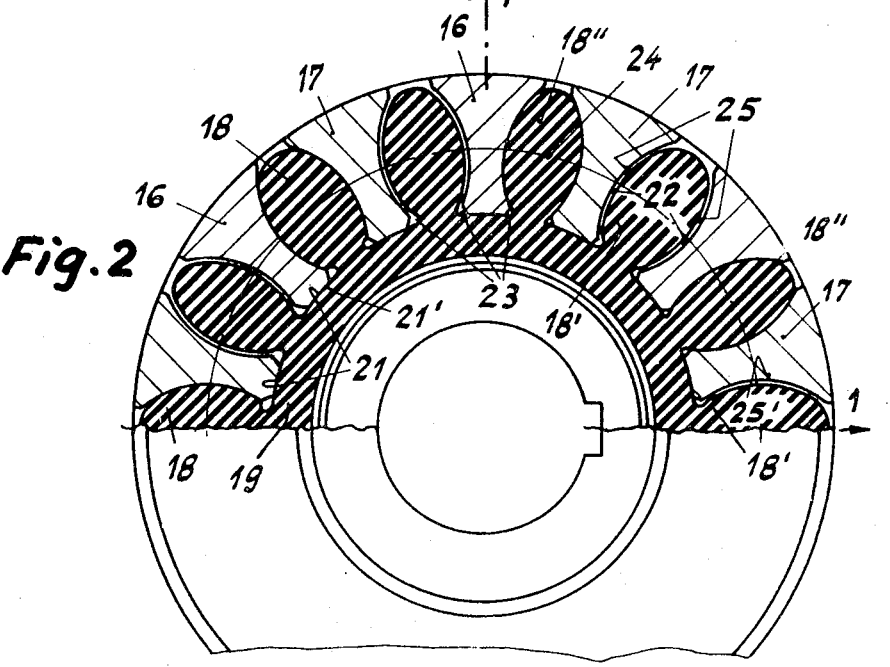
FIG. 2 is an end elevation view of the coupling of FIG. 1 partly in section as taken along line 2—2 of FIG. 1.
Figure 2A:
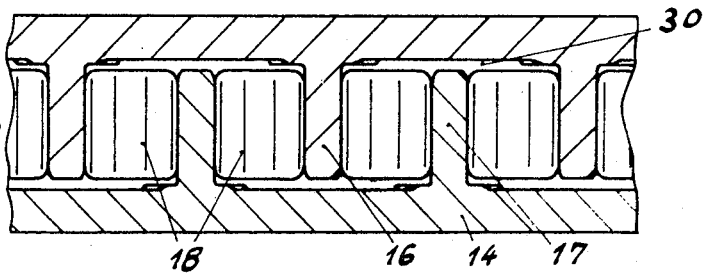
FIGS. 2a and 2b are sections of portions of the coupling as taken along the pitch circle of the flexible coupling in which elliptical pressure arms of a load transmission element are shown respectively in their loaded and unloaded state.
Figure 2B:
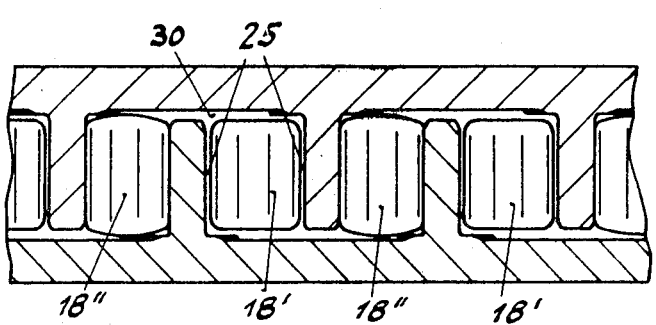

FIGS. 2a and 2b show portions of the coupling blades 16,17 and the pressure arms 18 in unloaded and loaded state respectively in sectional views, taken along the pitch circle 24. FIGS. 2a and 2b show the state of deformation of the then-loaded pressure arms 18'' and the clearance 25 which arises at the time under load between the unloaded pressure arms 18' of the load transmission unit and the blades 16,17 of the coupling members. In operation, alternate pressure arms are deformed to transmit torque between the coupling members while the other pressure arms are unloaded. When the direction of rotation, i.e., torque transfer is reversed, the pressure arms which were deformed are now loaded and vice versa.

Figure 3:
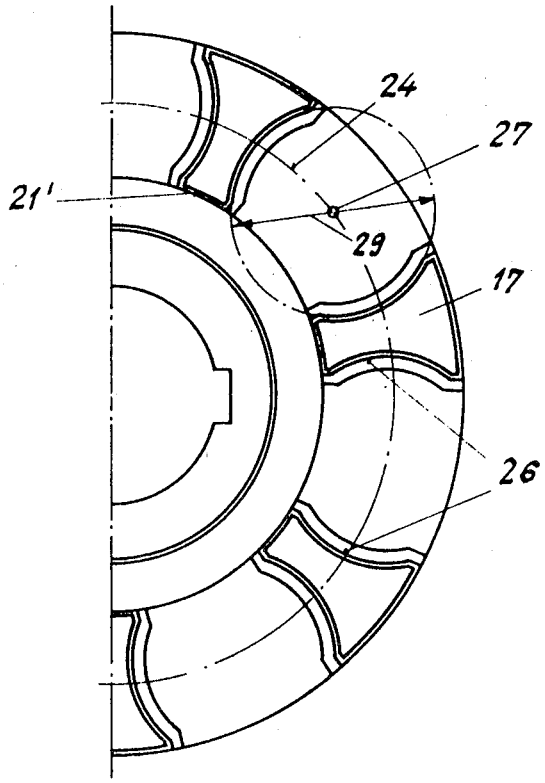
FIG. 3 is an end view of one-half of a coupling member showing in cross section radial blades of the member.

FIG. 3 shows a circular, concave sides 26 of neighboring radial blades 17 of a coupling member in cross section. In section, the sides 26 have a mutual center 27 on pitch circle 24, so that they can be machined to the required diameter 29 by a single setting corresponding to the particular size of coupling, preferably by means of end mills. This provides central unmachined clearances 30 (FIG. 1), forming free spaces for the ends of the coupling blades 16,17 and for deformation under load of the pressure arms 18 (see FIG. 2b). Annular part 19, which is slightly wider than pressure arms 18 (see FIG. 1), then has a clearance 19' to accommodate the particular axial shaft alignment.

Figure 4:
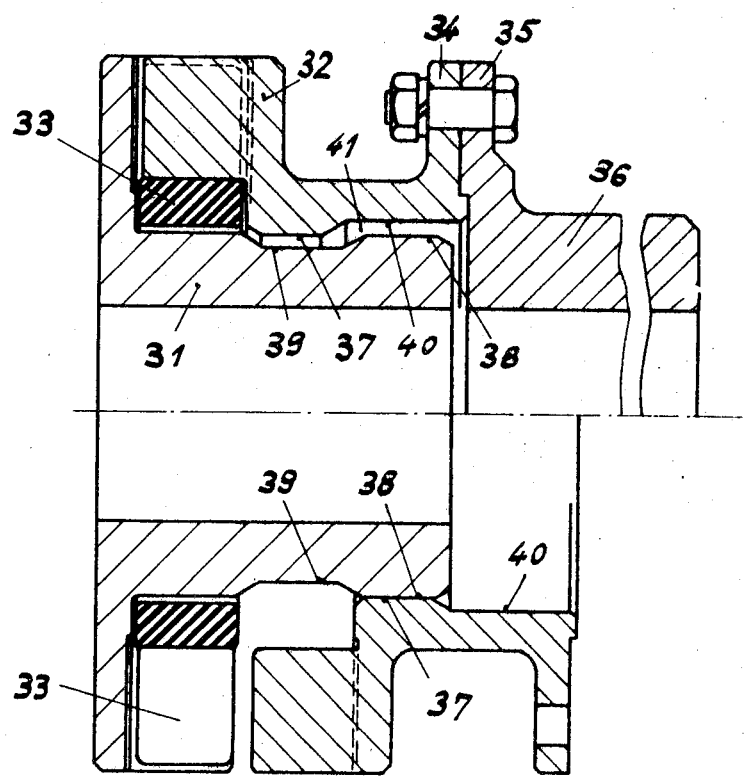
FIG. 4 is a longitudinal section of a single-engagement flexible coupling.

FIG. 4 shows a single-engagement coupling in its operational position on a shaft (not shown). The single-engagement coupling comprises an internal coupling member 31, an external coupling member 32 and a transmission unit 33 in one piece or in segments. A flange 34 of the outer coupling member 32 is fastened to flange 35 of a rigid half coupling 36 mounted on another shaft (not shown). The bottom half of FIG. 4 shows the pressure arms of the load transmission element 33 arranged between the blades of the inner coupling member 31. The outer coupling member 32, for the sake of accurate centering during assembly in respect of inner member 31, has a bore 37, which is a sliding fit on surface 38 of the hub of inner coupling member 31, so that the blades of the outer coupling member 32 can be easily introduced and accurately centered between the pressure arms of transmission unit 33. Recesses 39 and 40 with ends chamfered to less than 30° are present on the hub and sleeve portion of the inner and outer coupling members 31 and 32 to provide clearances 41 which facilitate proper alignment of the respective shafts to an angle of inclination up to 1° to 2°.

Figure 5:
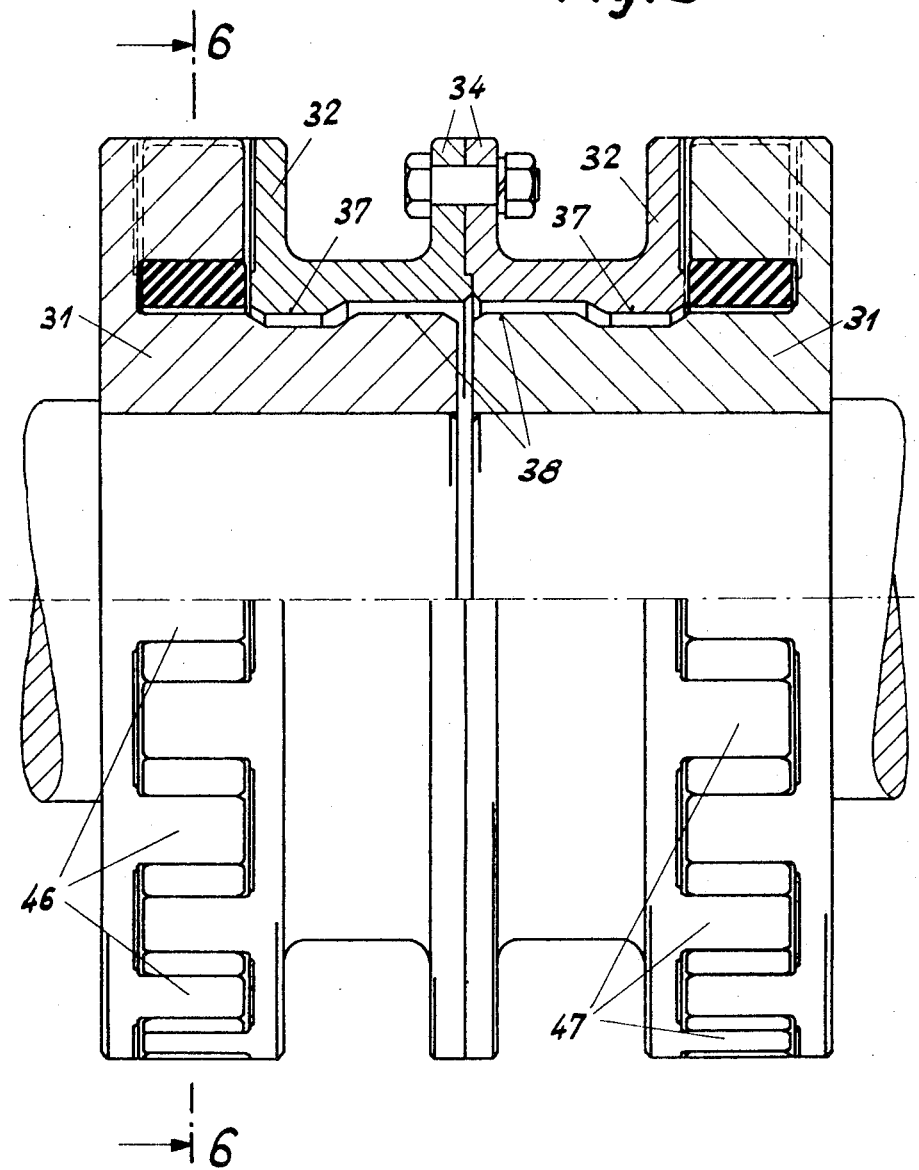
FIG. 5 is a side view partly in section of a double-engagement flexible coupling adapted for the transmission of comparatively heavy loads.
Figure 6:
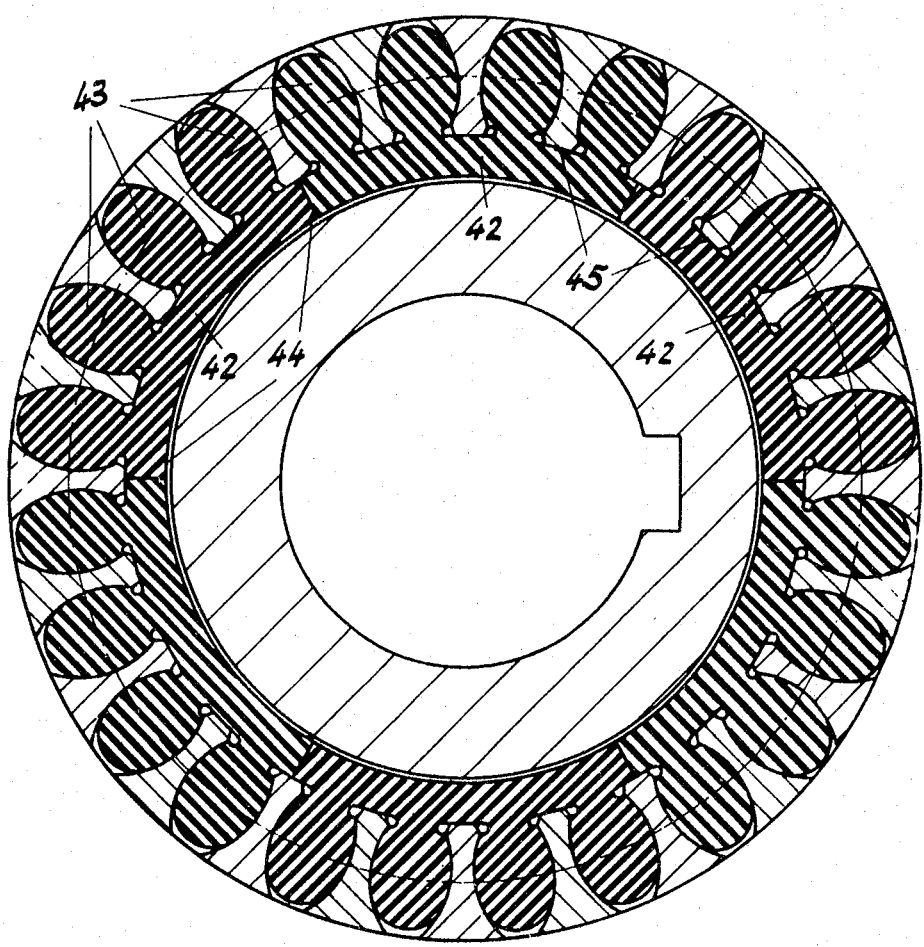
FIG. 6 is a sectional view taken along line 6—6 of FIG. 5, showing a load transmission unit consisting of six similar segments.

As with gear tooth couplings, the specified flexible coupling can also be embodied in numerous variants corresponding to particular practical applications. FIGS. 5 and 6 show a double-engagement flexible coupling whose inner and outer coupling members 31 and 32 are similar to those of the single-engagement coupling previously described. Flanges 34 of outer coupling members 32 are bolted to each other. The load transmission unit of the double-engagement flexible coupling consists of six segments 42, each of which has four elliptical pressure arms 43 and a ring portion. The ring segments 42 have flat ends which abut each other tightly at 44. These ring parts are then in close contact with corresponding inner faces 45 of blades 46 and 47 of the inside and outside coupling members 31 and 32. Such splitting of the transmission unit into segments is especially advantageous in the case of larger sized couplings, since it allows economic manufacture and assembly of the couplings. After insertion of the transmission unit segments 42 between the blades of inner member 31, the outer members 32 are centered and slid over inner members 31. Bore 37 and surface 38 then provide a sliding fit.

The load transmission unit consisting of a single member or segment can be manufactured preferably from natural or synthetic rubber, of any desired hardness. The high degree of hardness of butadiene acryl nitrile aid in the manufacture of the specified flexible coupling in such sizes as to be comparable in load transmissibility to gear tooth couplings of similar capacity. In these cases the deformation of the elliptical pressure arms 18, 43 at maximum permissible dead load can correspond to a relative torsional deflection of the coupling members amounting to about ½° to 2°.

The coupling members 10, 11, 31, 32 for smaller flexible couplings can preferably be made from steel as die castings or as shell-molded castings, and for medium and large couplings from cast steel of high strength and tenacity.

In addition to the high transmission capacity of comparable gear tooth couplings, the flexible coupling according to the invention possesses the advantage of these last-named couplings, in that it guarantees the compensation of any particular shaft alignment and a relative axial mobility of the united shafts in addition to the typical advantages of flexible couplings intrinsic in independence from lubrication, high shock absorptivity, silent running and low cost in manufacture and operation.

What is claimed is:

1. A flexible coupling comprising two coaxial coupling members including annular flanges with circumferentially spaced blades for the transmission of load, said blades projecting axially from the flanges to alternately interfit with one another and provide spaces between adjacent blades and a resilient load transmission means comprising an annular portion and a plurality of external, radial arms on said annular portion extending into said spaces for the transmission of load, said spaces and radial arms being substantially elliptical in shape and of rectangular cross section, said annular portion having outer faces between adjacent radial portions, said blades having inner end surfaces which confront and are in continuous pressure contact with said outer faces of the annular portion between adjacent radial portions, said radial arms each having two axial recesses in the region of their juncture with the annular portion to provide axial clearances between said arms and said blades at said recesses to maintain contact between said annular portion and the corresponding inner blade surfaces during deformation under stress of the respective loaded radial arms of the load transmission means and prevent the respective unloaded radial arms which are out of contact with the blades, from deflecting outward due to centrifugal force, so that all radial arms remain substantially constantly in centered working positions during load transmission.

2. A coupling as claimed in claim 1 in which one of said coupling members is an outer coupling member with a sleeve portion and the other coupling member is an inner coupling member with a hub part slidably fitted into said sleeve portion to effect engagement and centering of the blades of the coupling member with respect to the annular portion of the load transmission means.

3. A coupling as claimed in claim 2 wherein said hub part and sleeve portion define a clearance when said blades and annular arms are engaged whereby to permit small relative angular misalignment of the axes of said coupling members.

4. A coupling as claimed in claim 3 wherein said sleeve portion and hub part include respective axially spaced recesses to provide said clearances.

5. A coupling as claimed in claim 4 wherein said recesses have chamfered ends at an angle less than 30°.

6. A coupling as claimed in claim 1 wherein said annular and radial portions of said elastic load transmission element constitute a single, one-piece member.

7. A coupling as claimed in claim 1 wherein said load transmission means comprises a plurality of segments each constituted by a part of said annular portion with a respective plurality of said radial arms.

8. A coupling as claimed in claim 7 wherein the segments are arranged so that the parts of the annular portions are in tight abutment with one another.

9. A coupling as claimed in claim 1 wherein said annular portions are tightly fitted between said blades with the coupling at rest.

10. A coupling as claimed in claim 1 wherein said flanges of the coupling members have spaced surfaces facing one another in which said radial arms of the load transmission element are fitted, said radial arms having opposite ends spaced from the flange surfaces of the members to permit axial expansion of the radial arms during torque transmittance between the members.

* * * * *